Figure 1:
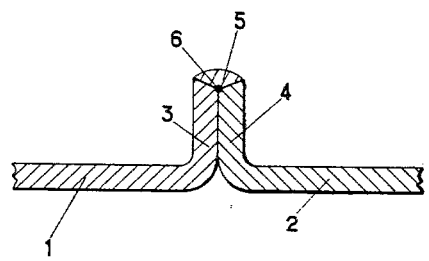

United States Patent Office 3,236,341
Patented Feb. 22, 1966

3,236,341
VACUUM-TIGHT JOINT
Guy Chopinet and Pierre Dumon, Paris, France, assignors to CSF-Compagnie Generale de Telegraphie Sans Fil, Paris, France
Filed Aug. 10, 1962, Ser. No. 216,140
Claims priority, application France, Sept. 25, 1961, 874,049
3 Claims. (Cl. 189—36)

The present invention relates to a method of realizing vacuum-tight joints or assemblies obtained by welding of relatively thin sheets or pieces, made of any similar or dissimilar metals, with the only condition that no metallurgical incompatibility exist between such metals, and also relates to the joints or assemblies thus obtained.

According to the known prior art technique, the terminal portions of the pieces, such as metal sheets, are normally bent, the bent surfaces are then placed one against the other to cause the edges thereof to coincide, and welding is thereupon effected along the end faces of these edges by fusion of the two edges, generally without additional metal. This method is generally known under the name of "raised-edge welding."

This known technique, however, entails the drawback that, after welding the possible beginning of a notch or crevice is allowed to remain at the point of junction of the two edges, which may develop to such an extent as to cause cracking of the joint either under mechanical or thermal stresses.

The present invention aims at a method for joining relatively thin pieces by raised-edge welding which avoids the afore-mentioned drawback.

According to the present invention, prior to welding, a groove or channel is made into each of the bent faces to be placed against one another, near the edges to be welded and essentially parallel to the welding seam, these two grooves complementing each other in such a manner as to define a channel or cavity; the edge-welding operation is thereupon effected in the usual manner.

Accordingly, it is an object of the present invention to provide a method for joining two metallurgically compatible parts which effectively avoids, by simple means, the disadvantages encountered in the prior art.

It is another object of the present invention to provide a method for joining two relatively thin pieces of metallurgically compatible material in a vacuum-tight manner which prevents deterioration of the joint under mechanical or thermal stresses.

A further object of the present invention resides in a method of joining together two relatively thin parts in a vacuum-tight manner while, at the same time, substantially eliminating the danger of subsequent cracking as a result of the further development of any minute notch or notches that may otherwise have been produced at the point of juncture between adjacent corners of the two parts.

A still further object resides in the provision of a joint between two metallurgically compatable parts that offers the features and advantages described hereinabove.

Another object of the present invention resides in the provision of a vacuum-tight joint between two metallic members which is not only capable of withstanding the stresses due to heating and thermal expansion but also perimts sterilization at relatively very elevated temperatures.

Figure 2:
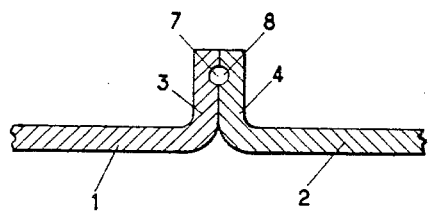
Figure 3:
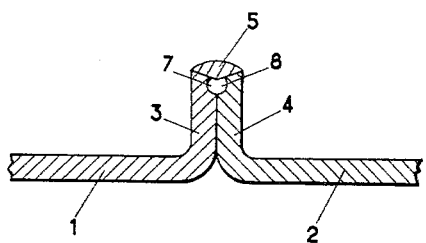

These and other objects, features and advantages of the present invention will become more obvious from the following description, when taken in connection with the accompanying drawing, which shows, for purposes of illustration only, a joint between relatively thin metal sheets made according to the known prior art technique, and one embodiment of a similar joint in accordance with the present invention, and wherein FIGURE 1 is a cross-sectional view through a joint made in accordance with the known prior art technique;

FIGURE 2 is a cross-sectional view, similar to FIGURE 1, through two pieces to be assembled and joined according to the present invention, and placed one against the other prior to welding thereof, and FIGURE 3 is a cross-sectional view through the pieces of FIGURE 2 after welding thereof and illustrating the completed joint in accordance with the present invention.

Referring now to the drawing, wherein like reference numerals are used throughout the various views to designate like parts, and more particularly to FIGURE 1 thereof, reference numerals 1 and 2 designate therein the assembled pieces to be joined while reference numerals 3 and 4 designate the bent terminal parts, and reference numeral 5 the welding performed along the raised edges. As pointed out hereinabove, in such prior art assembly there exists the shortcoming that, after the welding operation, the makings of a notch are allowed to remain at point 6 located at the junction of the edges. This notch may, however, develop in such a manner as to cause cracking of the joint either under mechanical stresses or thermal stresses.

In FIGURES 2 and 3, reference numerals 1 to 5 designate again the same elements as in FIGURE 1. However, according to the present invention, there are provided in this embodiment grooves 7 and 8 within the surfaces 3 and 4 which may have, for example, a semi-circular shape. These grooves 7 and 8 are essentially parallel to the end faces of the edges and are located near said edges at substantially the same distance in such a manner as to complete one another to form a channel or cavity when the surfaces 3 and 4 are placed one against the other.

When the welding operation is performed thereafter along the edges, it may be seen from FIGURE 3 that the weld 5 collapses slightly into the channel or cavity formed by the grooves 7 and 8 and, in this manner, there is no longer any notch effect when the welding is carried out.

The above-described method according to the present invention offers the further advantage that it permits the realization of joints which may be baked at a high temperature, for example, of the order of 500° C., and which are not prone to the fissuration as would be the case if the grooves according to the present invention were not used. These joints also withstand the differences of heat and of expansion between the pieces without risk of any damage thereto.

While we have shown and described one embodiment in accordance with the present invention, it is understood that the same is not limited thereto but is susceptible of many changes and modifications within the spirit and scope of the present invention and we, therefore, do not wish to be limited to the details shown and described herein but intend to cover all such changes and modications as are encompassed by the scope of the appended claims.

We claim:

1. A method of producing a vacuum-tight joint between two metal sheets, comprising the steps of establishing a groove in the surface of each of said sheets near one edge thereof and substantially parallel thereto at substantially the same distance from a respective edge, bending the terminal portion of each of said sheets provided with said groove, applying said bent portions one against the other so as to cause substantial coincidence of the edges of both sheets whereby the grooves in both sheets mutually complete each other to form a closed space within the metal of said bent portions, and melting said edges for welding together said sheets whereby molten metal collapses into said closed space.

2. A vacuum-tight joint between two metallic sheets provided with cut-out portions in mutually facing surfaces thereof spaced from respective edges, said cut-out portions being aligned so as to approximately complete each other to form a space within the metal of said sheets, and a welded seam along said edges with some solidified metal of the seam collapsed into said space.

3. A vacuum-tight joint between two metallic sheets provided with cut-out portions in the mutually facing surfaces thereof near respective edges, the cut-out portions being substantially parallel to the respective edges and extending at substantially the same distance from the edges, said cut-out portions being aligned so as to approximately complete each other to form a closed space within the metal of said sheets, and a welded seam along said edges with some solidified metal of the seam collapsed into said space.

References Cited by the Examiner
UNITED STATES PATENTS

| | | | |
|---|---|---|---|
| 2,256,924 | 9/1941 | Hopkins | 29—483 X |
| 2,410,191 | 10/1946 | West | 189—36 X |
| 3,051,279 | 8/1962 | Hongen | 29—482 X |

JOHN F. CAMPBELL, *Primary Examiner.*